United States Patent [19]

Resch

[11] 4,021,182

[45] May 3, 1977

[54] ACTUATION APPARATUS FOR THE MOVABLE MOLD HALVES OR PARTS OF AN INJECTION MOLDING MACHINE OR THE LIKE

[75] Inventor: Heinz Resch, St. Gallen, Switzerland

[73] Assignee: Gebrueder Buehler AG, Switzerland

[22] Filed: Oct. 28, 1975

[21] Appl. No.: 626,270

[30] Foreign Application Priority Data

Oct. 28, 1974 Switzerland .................... 14407/74

[52] U.S. Cl. .............................. 425/451.6; 74/520
[51] Int. Cl.² ........................................ B29C 3/02
[58] Field of Search ............... 425/451.6, DIG. 205; 74/520, 521

[56] References Cited

UNITED STATES PATENTS

| | | | |
|---|---|---|---|
| 2,447,256 | 8/1948 | Knowles | 425/451.6 |
| 3,359,598 | 12/1967 | Bucy | 425/451.6 X |

FOREIGN PATENTS OR APPLICATIONS

| | | | |
|---|---|---|---|
| 2,008,300 | 1/1971 | Germany | 425/451.6 |

*Primary Examiner*—Richard B. Lazarus
*Attorney, Agent, or Firm*—McGlew and Tuttle

[57] ABSTRACT

The actuation apparatus for the movable mold parts or halves of an injection molding machine, especially for the manufacture of foamed plastic articles, comprises pairs of toggle-lever rods with the toggle-lever rods of each pair being movable in essentially parallel planes which are spaced from one another. The toggle-lever rods of each pair are arranged between a movable mold support plate and a stationary toggle plate, and can be conjointly selectively extended or retracted by means of a driven toggle head. The planes within which the toggle-lever rods operate extend obliquely across the movable mold support plate and the toggle plate, and the pairs of toggle-lever rods are arranged symmetrically on opposite sides of a vertical plane of symmetry containing the central longitudinal axis of the machine. The points of application of the forces of the toggle-lever rods of each pair at the mold support plate and the toggle plate, are in vertically spaced alignment with each other and such points are located, in the plane of each plate, at the corners of rectangles or squares. The essentially parallel planes of the pairs of toggle-lever rods on respective opposites sides of such plane of symmetry are inclined towards one another at equal angles to such plane of symmetry.

10 Claims, 3 Drawing Figures

ACTUATION APPARATUS FOR THE MOVABLE MOLD HALVES OR PARTS OF AN INJECTION MOLDING MACHINE OR THE LIKE

BACKGROUND OF THE INVENTION

The present invention relates to a new and improved construction of an actuation apparatus for the movable mold parts or halves of a molding machine, in particular an injection molding machine, especially for the manufacture of foamed articles or the like, which apparatus is of the type comprising pairs of togglelever rods movable in essentially parallel planes spaced from one another, the toggle-lever rods being located between a movable mold support plate or platen and a stationary toggle plate, there further being provided a driven toggle head means for extending or retracting the toggle-lever rods.

Actuation devices of this general type have been disclosed, for instance, in Swiss Pat. No. 331,325 and U.S. Pat. No. 3,577,596. In order to increase the stroke of actuation devices of this type it is considered obvious to those versed in the art to construct the linkages and levers of the toggle-lever rods as long as possible. The positional offsetting of parallelly arranged toggle-lever rods insures that the latter are able to overlappingly extend and collapse or bend past one another. Due to the offsetting positional arrangement of the toggle-lever rods and therefore the points of application of the forces at the movable mold support plate and the stationary toggle plate there prevails, however, an unfavorable distribution of the forces which can result in undesired moments in the planes of the movable mold support plate and the toggle plate, respectively, if there are not undertaken measures for suppressing the development of such moments.

SUMMARY OF THE INVENTION

It is therefore a primary object of the present invention to provide a new and improved construction of apparatus for the actuation of the movable mold parts of an injection molding machine or the like in a manner obviating the aforementioned drawbacks and limitations of the prior art proposals.

Another and more specific object of the present invention is directed towards the provision of a novel actuation apparatus of the previously described character which is constructed in such a manner that there can be realized a large stroke with a balanced distribution of the forces without disturbing moments arising, and specifically an actuation apparatus especially suitable for use in conjunction with foamable- thermoplastic-molding machines, by means of which it is possible to fabricate foamed plastic articles, and wherein the closing force is small in comparison with that required for the production of massive articles or objects and owing to the large dimensions of the injection molded article there is required a large opening stroke.

A further object of the invention aims at the provision of new and improved actuation means molding equipment insuring for a reliable, accurate mold opening and closing operation, with good distribution of forces, avoidance of the formation of undesired moments at the equipment, and generally resulting in improved performance characteristics and operational reliability of the molding equipment.

Now in order to implement these and still further objects of the invention, which will become more readily apparent as the description proceeds, the invention contemplates that the planes within which the toggle-lever rods function or operate extend obliquely or at a slant across the movable mold support plate and the toggle plate, respectively, in a manner such that the points of application of the forces of the toggle-lever rods at the plates are located, when viewed in the planes of these plates, at the corners of a rectangle or square. Further, the parallel planes of the pairs of toggle-lever rods at respective opposite sides of a plane of symmetry containing the lengthwise axis of the injection molding machine are inclined or slanted towards one another.

In order to effectively solve the objectives of the invention it is necessary to carry out two measures:

Firstly, the toggle-lever rods, viewed in a plane parallel to the toggle plate and movable support plate, must be obliquely positioned, i.e. extend across an inclination at the toggle plate, and the movable mold support plate in order to be able to balance the non-uniform arrangement of the force application points at these components such as would occur in the case of straight toggle-lever rods, that is to say, toggle-lever rods positioned parallel to a symmetry plane through the lengthwise axis of the injection molding machine.

Secondly, the pairs of parallelly arranged toggle-lever rods on opposite sides of the symmetry axis of the injection molding machine must be oriented at an inclination or obliquely to each other, to insure that the moments of the forces transmitted to the movable mold support plate and the toggle plate can be present in the operational planes of the toggle-lever rods, balance one another out, and prevent these moments loading the guiding arrangement or guides for the components.

In order to be able to provide an arrangement wherein the position of the force application points according to the first discussed measure can be realized at the corners of rectangles or squares, the toggle-lever rods opposite sides of the aforementioned plane containing the lengthwise axis of the machine must be positively inclined to each other at equal angles with respect to such plane.

BRIEF DESCRIPTION OF THE DRAWINGS

The invention will be better understood, and objects other than those set forth above will become apparent, when consideration is given to the following detailed description thereof. Such description makes reference to the annexed drawings wherein.

DETAILED DESCRIPTION OF THE PREFERRED EMBODIMENTS

Figure 1:
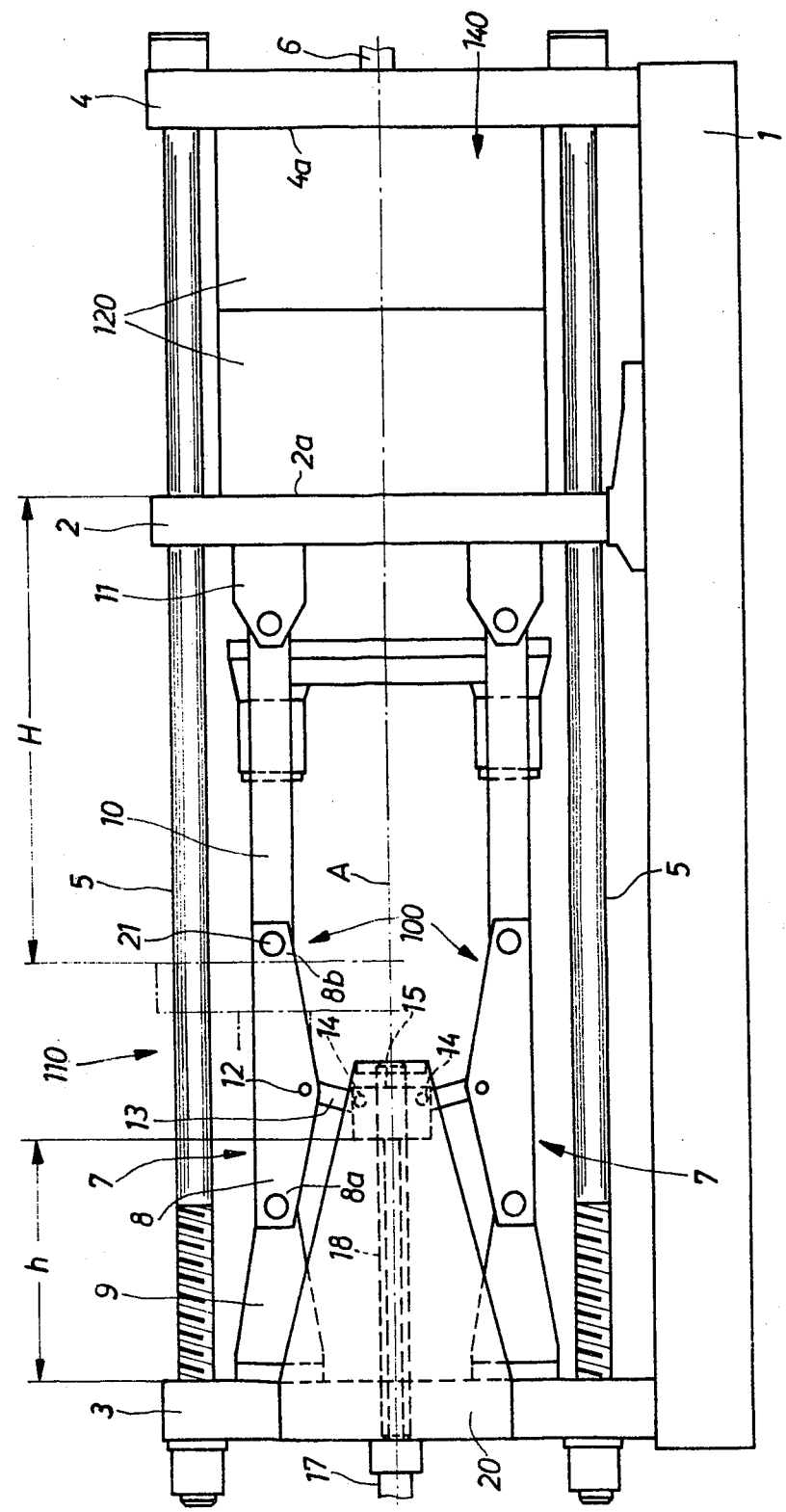
FIG. 1 is a side view of actuation apparatus constructed according to the teachings of the present invention illustrating the extended position or condition of the toggle-lever rods.

Describing now the drawings, the exemplary embodiment of actuation apparatus, generally indicated in its entirety by reference character 100, for molding equipment, such as for instance an injection molding machine 110, is arranged between a mold support plate or platen 2 movable upon a machine bed 1 and a stationary plate or toggle plate 3. A further major component of the injection molding machine 110 is constituted by a stationary mold support plate 4. Between the mold support plate 4 and the toggle plate 3 there are arranged a total of four guides or guide columns 5 or equivalent structure for the movable mold support plate 2. The movable mold support plate 2 and the stationary mold support plate 4 support, at their respective confronting faces 2a and 4a, the schematically illustrated, conventional mold parts or halves 120 which, when closed, due to the actuation apparatus 100 of FIG. 1 being extended, as shown, surround a not particularly referenced closed mold compartment or cavity into which there can be injected liquid plastic material by means of an injection cylinder 6, as is well known in this particular art.

The actuation apparatus 100 of this development embodies a toggle-lever mechanism 130 or equivalent structure comprising by way of example, a total of four toggle-lever rods 7. Each toggle-lever rod 7 comprises a double-arm lever 8 which is hingedly connected or articulated to one end 8a at a bearing or pillow block 9 supported at the toggle plate 3 and at its other end 8b via a link or guide 10 to a bearing or pillow block 11 of the mold support or carrier plate 2. By means of an intermediate pivot or bearing 12 or the like, the double-arm lever 8 is articulated or hingedly connected via a further link or guide 13 with a hinge or pivot 14 of a toggle head 15.

Figure 3:
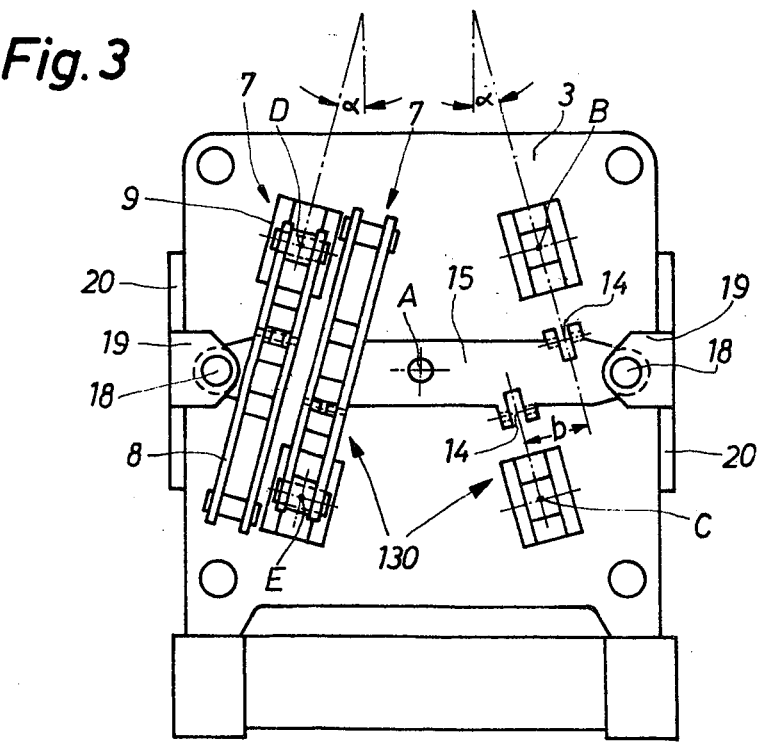
FIG. 3 is a cross-sectional view of the arrangement of FIG. 2, taken substantially along the line III—III thereof, and omitting some of the components to enhance clarity in illustration.

The toggle head 15 is displaceably guided by means of the double-acting piston-and-cylinder means 17 arranged at the region of the lengthwise axis of the molding machine 110 and therefore is displaceable upon the guide columns or rods 18 which are held at their one ends by the webs 19 of two elongated brackets 20 fixed to, and extending inwardly from, the toggle plate 3, as best seen by referring to FIG. 3. At their other ends these guide columns 18 are fixedly anchored in any suitable manner in the toggle plate 3.

Figure 2:
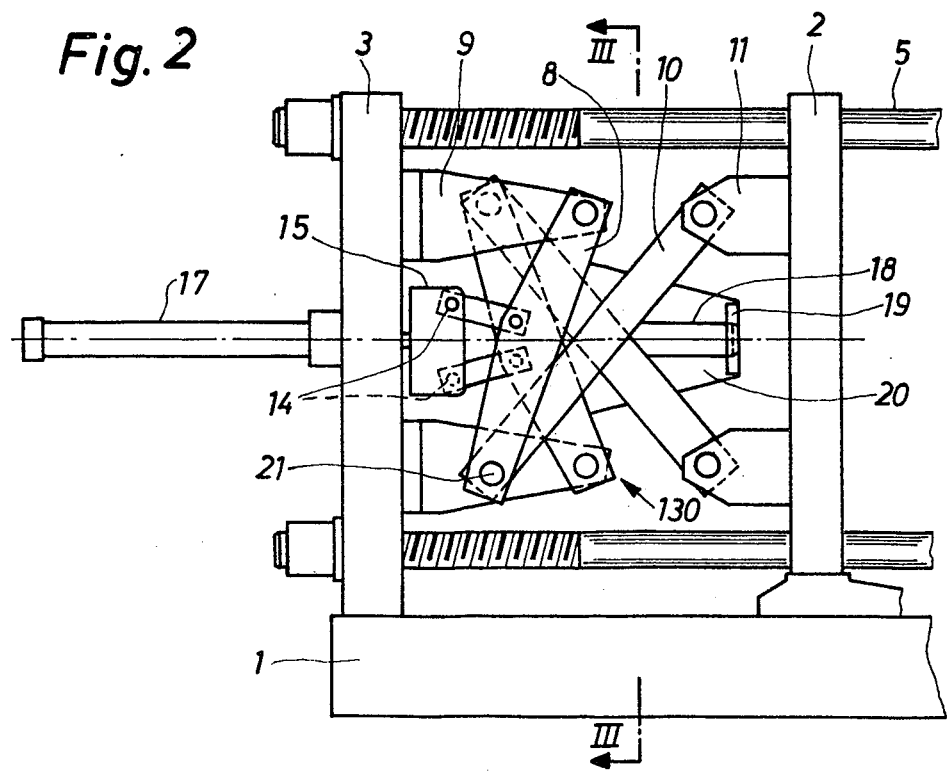
FIG. 2 is a side view of part of the apparatus shown in FIG. 1, but this time showing the toggle-lever rods completely retracted or collapsibly bent.

The length of each double-arm lever 8 and the associated link or guide 10 is of such dimension or size that its connection location or hinge points 21, upon opening the mold 140, is rocked past the substantially horizontal central plane of the machine 110, as best seen by referring to FIG. 2. The total stroke H of the mold support plate 2 which can be realized by means of the toggle-lever rods 7 is therefore considerably greater than the stroke $h$ of the toggle head 15.

Now in order to render it possible, in accordance with the showing of FIG. 2 for the toggle-lever rods 7 to be able to bend or collapse past one another when collapsed or retracted, it will be recognized, from the illustration of FIG. 3, that they are arranged in pairs on respective opposite sides of the central normal or vertical plane of the machine 110. The spacing between the parallel operating central planes of the toggle-lever rods 7, of the pair at the right side of the lengthwise extending machine axis A shown in FIG. 3, has been indicated by reference character $b$ and, for better clarity in FIG. 3, the rod portions of the toggle-lever mechanism 130 have not been illustrated at such side of the axis A. The points of application of the forces of the toggle-lever rods at the right side of axis A to the toggle plate 3, in FIG. 3, have been designated by reference characters B and C, whereas such force application points or locations for the toggle-lever rods 7 at the other side in the axis A of FIG. 3 have been designated by reference characters D and E.

From FIG. 3, it will be noted that the point of connection or force application B of the right hand toggle-lever rod 7, to the right of the axis A, is in vertically spaced and aligned relation with the connection or point of force application of the left-hand toggle-lever rod of the pair of toggle-lever rods to the right of the axis A. Similarly, of the pair of toggle-lever rods to the left of the axis A in FIG. 3, the left toggle-lever rod has a connection point or point of force application D which is vertically spaced and aligned with the point E at which the right toggle-lever rod of the pair is connected to the toggle plate 3. Furthermore, the force application points B and D are at the same level, and the force application points C and E are likewise at the same level. This connection scheme holds true as well for the force application points at the movable molds of mold support plate 2. Consequently, it will be noted that, apart from unavoidable tolerances, the force application points are located at the corners of an essentially right-angle quadrilateral, and specifically in the embodiment under consideration essentially at the corners of a square substantially symmetrically arranged with regard to the central vertical plane of the injection molding machine 110. As will be explained later, the quadrilateral may be also essentially a rectangle, at the corners of which there are located such force application points. The reason that the force application points are at the region of the corners of a square is predicated upon the fact the the respective parallel planes within which each pair of toggle-lever rods 7 can be extended and retracted are positioned obliquely or at an inclination angle $\alpha$ relative to the verticle (FIG. 3). Due to this arrangement there is insured a completely symmetrical application of the closing force at the toggle plate 3 and at the movable mold support plate 2. If such inclined arrangement of the toggle-lever rods or arms 7 were not provided, then the force application points at the toggle plate 3 and at the mold support plate 2 would be located at the corners of a trapezoid or a parallelogram, resulting in a non-symmetrical and therefore non-balanced force application at both of these components.

According to the showing of FIG. 3, respective pairs of toggle-lever rods 7 are inclined in opposite directions through the angle $\alpha$ of the same magnitude, on opposite sides of the central vertical plane of the machine 110. In this way there is achieved the beneficial result that it is not possible for there to be formed, in the plane of the toggle plate 3 and that of the mold support plate 2, any unbalanced moments owing to forces acting obliquely or at a slant upon these components. These moments are produced by the force components acting in the plane of the toggle plate 3 and the plane of the mold support plate 2, and appearing when the levers 8 and guides or links 10 are not completely extended and, with respect to the axis A serving as the pivot axis, are effective in opposed relationship to one another.

The arrangement or disposition of the force application points B, C, D and E at the corners of a square also can be realized if the toggle-lever rods 7 at both sides are inclined in the same direction, i.e. if all of them are essentially parallel to one another. However, this construction would not provide for compensated or balanced moments in the plane of the toggle plate and mold support plate, because the force components, acting in the planes of the plates, of the forces transmitted via the double-arm levers 8 and the links or guides 10 then cannot act through the agency of the same length lever arms upon the mold support plate 2 and the toggle plate 3 and such components would strive to rotate about the pivot axis A. The result thereof would be an undesired loading of the guiding- and attachment elements of the components 2 and 3 respectively.

By means of the desired actuation apparatus 100 there can be quickly carried out a large displacement or stroke H of the movable mold support plate 2 with balanced forces and moments without loading the guides 5 upon actuation of the mold support plate 2.

As already mentioned above, it is also within the teachings of the present invention if the force application points, corresponding to the depicted force application points B, C, D and E, are located at or near the corners of a rectangle which is symmetrical to a plane of symmetry containing the axis A, preferably symmetrical to the central vertical plane of the machine. Furthermore, it is within the contemplation of the invention if several or more pairs of toggle-lever rods 7 are arranged in each instance at opposite sides of the toggle head 15.

While there is shown and described present preferred embodiments of the invention, it is to be distinctly understood that the invention is not limited thereto, but may be otherwise variously embodied and practiced within the scope of the following claims. Accordingly,

What is claimed is:

1. An actuation apparatus for the movable mold parts of a mold of an injection molding machine, especially for the fabrication of foamed plastic articles, comprising a movable mold support plate, a stationary toggle plate, pairs of toggle-lever rods arranged between the movable mold support plate and the stationary toggle plate symmetrically on opposite sides of a plane of symmetry containing the central longitudinal axis of the injection molding machine, the two toggle-lever rods of each pair being spaced from one another and arranged for operable movement in substantially parallel planes, and driven toggle head means operable to extend and retract said toggle-lever rods, the planes within which the toggle-lever rods operate being disposed obliquely relative to such plane of symmetry with the points of application of the forces of the togglelever rods to said plates, viewed in the plane of each plate, being disposed at the region of the corners of a right-angled quadrilateral, and the substantially parallel planes of the toggle-lever rods on each side of such plane of symmetry being inclined toward each other at substantially equal angles to such plane of symmetry.

2. The actuation apparatus as defined in claim 1, wherein the substantially right-angled quadrilateral is constituted by a square.

3. The actuation apparatus as defined in claim 1, wherein the substantially right-angled quadrilateral is constituted by a rectangle.

4. The actuation apparatus as defined in claim 1, wherein there is one pair of said toggle-lever rods are located at each side of said plane of symmetry.

5. The actuation apparatus as defined in claim 4, wherein there are provided a total of four-toggle lever rods.

6. The actuation apparatus as defined in claim 1, wherein the substantially right-angled quadrilateral is located in a plane containing the movable mold support plate substantially symmetrically to such plane of symmetry.

7. The actuation apparatus as defined in claim 1, wherein the substantially right-angled quadrilateral is located in a plane containing the toggle plate substantially to such plane of symmetry.

8. The actuation apparatus as defined in claim 1, wherein each toggle-lever rod comprises a double-arm lever having one end directly hingedly connected by hinge means to the toggle plate and its other end hingedly connected by hinge means through a first link means to the movable mold support plate, guide column means for said toggle head means, intermediate pivot means on the double-arm lever, second hinge means hingedly connecting said double-arm lever at said intermediate pivot means to the toggle head, the double-arm lever and the first link means possessing a length such that, upon opening of the mold, the respective hinge means connecting the double-arm lever with the first link means, of a pair of toggle-lever rods arranged in said substantially parallel planes, move past one another and are pivoted past a central plane of the machine containing said guide column means for said toggle head means.

9. The actuation apparatus as defined in claim 1, wherein, with respect to each pair of toggle-lever rods, the two toggle-lever rods are connected to each said plate at respective force application points which are in vertically spaced vertical alignment with each other.

10. An actuation apparatus for the movable mold parts of a molding machine comprising a movable mold support plate, a stationary plate, at least two pairs of toggle-lever means arranged between the movable mold support plate and the stationary plate symmetrically on opposite sides of a plane of symmetry containing the central longitudinal axis of the injection molding machine, the two toggle-lever means of each pair being spaced from one another and arranged for movement in substantially parallel planes, toggle head means operable to extend and retract said toggle-lever means, means operable to drive said toggle head means, the planes within which the toggle-lever means operate being disposed at an inclination relative to such plane of symmetry with the points of application of the forces of the toggle lever means to such plates, viewed in a direction at right angles to planes containing said plates, being disposed at the region of the corners of a right-angled qudrilateral, and the substantially parallel planes of the respective pairs of toggle-lever means on each side of such plane of symmetry being inclined toward each other at substantially equal angles to such plane of symmetry.

* * * * *